E. G. WEBBER.
TUBING DIE.
APPLICATION FILED AUG. 24, 1917.

1,248,963.

Patented Dec. 4, 1917.

WITNESS
W. C. Ron.

INVENTOR.
E. Gray Webber.
BY Chapin & Neal
ATTORNEYS.

UNITED STATES PATENT OFFICE.

EZRA GRAY WEBBER, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TUBING-DIE.

1,248,963.  Specification of Letters Patent.  Patented Dec. 4, 1917.

Application filed August 24, 1917.  Serial No. 187,947.

*To all whom it may concern:*

Be it known that I, EZRA GRAY WEBBER, a citizen of the United States of America, residing at Chicopee Falls, in the county of Hampden and State of Massachusetts, have invented certain new and useful Improvements in Tubing-Dies, of which the following is a specification.

This invention relates to improvements in tubing dies and, while the invention is capable of general application, it is particularly advantageous for and finds one specific use in tubing apparatus of the type disclosed in my copending application Serial No. 141,217, filed January 8, 1917.

Tubing apparatus of the type referred to is used among other things, for the production of strips of rubber stock which are subsequently used in the manufacture of tire shoes. For the formation of such strips, a die, such as is shown in the United States Letters Patent No. 1,133,892, granted to J. L. Swartz, March 30, 1915, is conveniently employed. This die permits the expeditious formation of a tube, the bore of which is disposed eccentrically with relation to its outer periphery and slits the tube to form a strip, the thickness of which varies from one edge to the other. It is highly essential that the strip formed by the tubing die be of uniform thickness throughout its length, and, although it may be thought that material forced through a die of constant opening would necessarily be of uniform thickness throughout its length, experience has shown that, when dealing with plastic material, such as rubber stock, for example, this is not necessarily true. The strip formed by the tubing die is not exactly of the same size as the die, for due to its inherent plasticity and elasticity, it tends to spring outwardly after leaving the confines of the die. It will be apparent then that succeeding batches of rubber stock thrown into the machine may cause a variation in the thickness of the strip formed unless each batch is precisely alike in its properties and particularly elasticity. It has been found extremely difficult to make each batch of rubber stock of exactly the same elasticity and the practical difficulties encountered due to variations in the raw material have made it inexpedient to attempt precise uniformity. The present invention seeks to provide a tubing die wherein compensatory adjustments may be made from time to time, as necessitated by varying conditions in the material to be handled, to maintain the tube formed by the die of the desired size and shape despite varying characteristics in the material.

An object of this invention is to provide a tubing die having a core associated therewith and arranged for the production of a tube and means to conveniently vary the effective die opening to increase or decrease the thickness of the tube forced therefrom.

Other objects and advantages will appear in the description to follow and will be particularly pointed out in the appended claims.

A preferred embodiment of the invention is shown for illustrative purposes in the accompanying drawings, in which—

Figure 1:
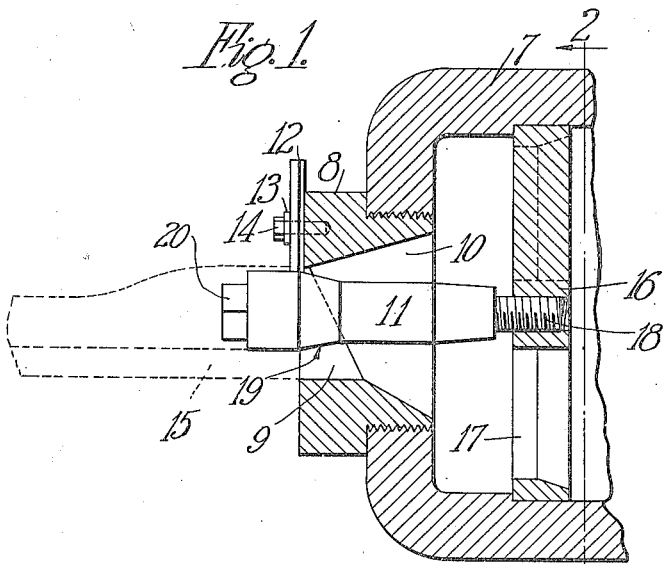
Figure 1 is a sectional elevation of the improved tubing die.
Figure 2:
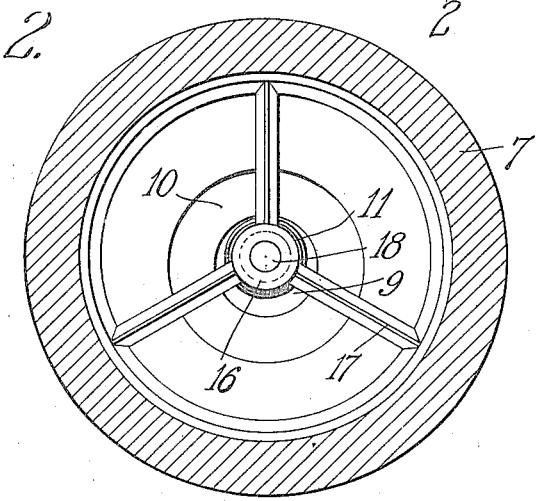
Fig. 2 is a cross sectional view taken on the line 2—2 of Fig. 1.
Figure 3:
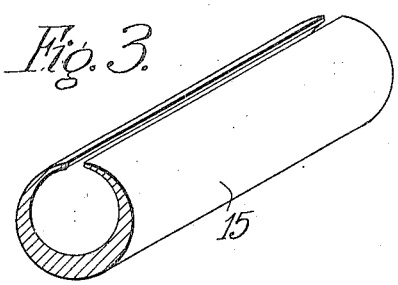
Fig. 3 is a perspective view of the tube formed by the die.

Referring to these drawings in detail and particularly to Fig. 1, reference 7 indicates the cylinder of a tubing machine. A portion only of this cylinder, the discharge end, has been illustrated as the remaining parts of the cylinder and tubing machine are well known in the art and consequently unnecessary to an understanding of the invention. A die 8 is threaded in the end face of member 7, and this die is formed with a cylindrical outlet opening 9 which is connected to the interior of cylinder 7 by an enlarged funnel-shaped opening 10. A cylindrical core 11, to be more fully described below, is mounted eccentrically with respect to opening 9 as will be apparent from an inspection of Fig. 2. Cylinder 7 is adapted to receive plastic material, such as rubber stock, for example, which is arranged to be forced through openings 9 and 10 to produce a tube wherein the thickness, in the example shown, varies throughout its periphery. Preferably a knife 12, adjustably clamped to the end face of cylinder 7 by a plate 13 and bolts 14, is arranged to bear upon the upper peripheral portion of core 11, so that the tube is slit as it leaves die 8, whereby a strip 15 of substantially the shape shown in Fig. 3 is formed.

The structure so far described is substantially like that disclosed in the above-identified patent. The core 11, however, is of improved construction and is mounted in an improved manner, as will now be described. Core 11, in the illustrated embodiment of the invention, is supported in eccentric relation to opening 9 by a spider 16 which is suitably fixed within cylinder 7, as by a driving fit, for example. The shape of spider 16 is best shown in Fig. 2 and preferably the radial arms 17 thereof are beveled rearwardly to minimize the resistance presented to the passage of rubber stock through cylinder 7. Core 11 has a threaded end 18 which is adapted to screw into an interiorly threaded hole in the hub of spider 16. A frusto conical surface 19 is formed on core 11 adjacent the outlet of die 8 and the outer end of the core is provided with a squared portion 20 to receive a socket wrench. It will be obvious that as core 11 is turned, it will be moved axially forward or backward relatively to die 8 and by this relative displacement, the frusto conical surface 19 may be so positioned in the bore 9 as to cause an increase or decrease in the effective cross sectional area of the die opening. Thus, the cross sectional size of the strip 15 may be varied, and it is to be noted that this variation may be conveniently made without stopping the machine. The tube, split as it leaves the die, springs open as indicated in Fig. 1 so that the portion 20, squared to receive a wrench, is at all times conveniently accessible to the operator.

The described means for adjusting the die opening is useful and important in all tubing dies since it permits enlargement or restriction of the die opening from time to time to compensate for variations in the elasticity of the material forced through the die. Thus, if one batch of material has a somewhat higher degree of elasticity than that of a preceding batch, the die opening may be restricted slightly so that the increased spring of the material after leaving the confines of the die is counteracted by the decrease in size of the die opening. The invention is also particularly important for use with tubing apparatus such as disclosed in my above identified copending application for it permits the necessary compensatory adjustments to be conveniently made without stopping the machine, so that lengths of tubing of uniform cross sectional size may be expeditiously formed.

The invention has been described in a preferred form for illustrative purposes, but the scope of the invention is defined by the appended claims rather than by the foregoing description.

What I claim is—

1. A tubing die, comprising, a body having a cylindrical bore provided with an enlarged funnel-shaped inner end into which plastic material may be forced, a core projecting through the bore to form an annular discharge opening and mounted for adjustment relatively to the bore, a cutter projecting across the discharge opening to slit the formed tube as it is forced therethrough, and means accessible through the slit in said tube to adjust the core, all constructed and arranged so that the size of the die opening may be varied without interfering with the production of the tube.

2. A tubing die, comprising, a member formed with a cylindrical bore and provided with an enlarged funnel-shaped inner end into which plastic material may be forced, a core projecting through said bore and formed with a frusto conical surface adjacent the mouth of the bore, and means for axially shifting said core and member, the one relatively to the other, during the production of the tube whereby the thickness of the tube formed by the die may be varied as desired.

3. A tubing die, comprising, a member formed with a cylindrical bore and provided with an enlarged funnel-shaped inner end into which plastic material may be forced, a core projecting through said bore and formed with a frusto conical surface adjacent the outlet of the bore, a support for said core, the latter having a screw thread engagement with said support and arranged to be turned during the production of the tube, whereby when the core is turned said surface may be axially shifted relatively to the outlet of said bore to vary the effective cross sectional area of said outlet.

E. GRAY WEBBER.